(12) United States Patent
Desai

(10) Patent No.: US 8,526,348 B2
(45) Date of Patent: *Sep. 3, 2013

(54) COLLABORATIVE COEXISTENCE OF CO-LOCATED MOBILE WIMAX, WIRELESS LAN, AND/OR BLUETOOTH RADIOS

(75) Inventor: Prasanna Desai, Elfin Forest, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,744

(22) Filed: Dec. 3, 2011

(65) Prior Publication Data
US 2012/0076061 A1 Mar. 29, 2012

Related U.S. Application Data

(63) Continuation of application No. 12/048,444, filed on Mar. 14, 2008, now Pat. No. 8,072,913.

(60) Provisional application No. 61/025,794, filed on Feb. 3, 2008.

(51) Int. Cl.
*G08C 17/00* (2006.01)

(52) U.S. Cl.
USPC .......................................................... 370/311

(58) Field of Classification Search
USPC ................ 370/276, 310, 314, 331, 462, 465, 370/466, 467, 468, 338, 389, 392, 395.4, 370/395.42, 395.5, 431, 442, 445, 446, 447, 370/448, 449, 458, 470, 472, 474
See application file for complete search history.

(56) References Cited

U.S. PATENT DOCUMENTS

| | | | | |
|---|---|---|---|---|
| 7,039,358 | B1* | 5/2006 | Shellhammer et al. | 455/41.2 |
| 2005/0025104 | A1* | 2/2005 | Fischer et al. | 370/338 |
| 2008/0130603 | A1* | 6/2008 | Wentink et al. | 370/338 |
| 2009/0017756 | A1* | 1/2009 | Tsfaty et al. | 455/41.2 |
| 2009/0081962 | A1* | 3/2009 | Sohrabi | 455/79 |

* cited by examiner

*Primary Examiner* — Dady Chery
(74) *Attorney, Agent, or Firm* — Garlick & Markison; Shayne X. Short

(57) ABSTRACT

Collaborative coexistence of co-located mobile WiMAX, wireless LAN, and/or Bluetooth radios. Within a communication device that includes multi-protocol communication capability, the various radio modules included within such a communication device operate cooperatively such that collisions are avoided between those various radios. When a first of the radio modules operates as governed by a relatively rigid frame structure, a second of the radio modules capitalizes upon that predetermined nature (of the relatively rigid frame structure) to support communication during times in which that first radio module has a lower level of activity (e.g., turned off completely, within a power savings mode, in a sleep mode, etc.). The radio module operation is performed within a time-orthogonal manner, such that multiple radio modules are not attempting to transmit or receive simultaneously. Moreover, CTS2SELF operation can be employed alone or in conjunction with power savings operation of colocated radios within a communication device.

20 Claims, 11 Drawing Sheets

COLLABORATIVE COEXISTENCE OF CO-LOCATED MOBILE WIMAX, WIRELESS LAN, AND/OR BLUETOOTH RADIOS

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility patent application Ser. No. 12/048,444, entitled "Collaborative coexistence of co-located mobile WiMAX, wireless LAN, and/or Bluetooth radios," filed Mar. 14, 2008, pending, and scheduled to be issued as U.S. Pat. No. 8,072,913 on Dec. 6, 2011 (as indicated in an ISSUE NOTIFICATION mailed on Nov. 16, 2011), which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 61/025,794, entitled "Collaborative coexistence of co-located mobile WiMAX, wireless LAN, and/or Bluetooth radios," filed Feb. 3, 2008, now expired.

Incorporation by Reference

The following U.S. Utility Patent Applications are hereby incorporated herein by reference in their entirety and made part of the present U.S. Utility patent application for all purposes:

1. U.S. Utility patent application Ser. No. 11/545,743, entitled "Collision avoidance in multiple protocol communication networks using a shared communication medium," filed Oct. 10, 2006, now U.S. Pat. No. 7,957,411 issued on Jun. 7, 2011.

2. U.S. Utility patent application Ser. No. 11/651,784, entitled "Co-location interference avoidance in multiple protocol communication networks," filed Jan. 10, 2007, now U.S. Pat. No. 7,813,295 issued on Oct. 12, 2010.

BACKGROUND OF THE INVENTION

1. Technical Field of the Invention

The invention relates generally to communication systems; and, more particularly, it relates to communication devices implemented within such communication systems that support communication in accordance with more than one standard, protocol, and/or other predetermined means of performing communication.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. However, such desires have gone unrealized when it comes to implementing baseband and RF on the same chip for multiple wireless communication standards. In addition, many components and/or modules within the components employed within such communication devices and wireless communication devices include many off-chip elements.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
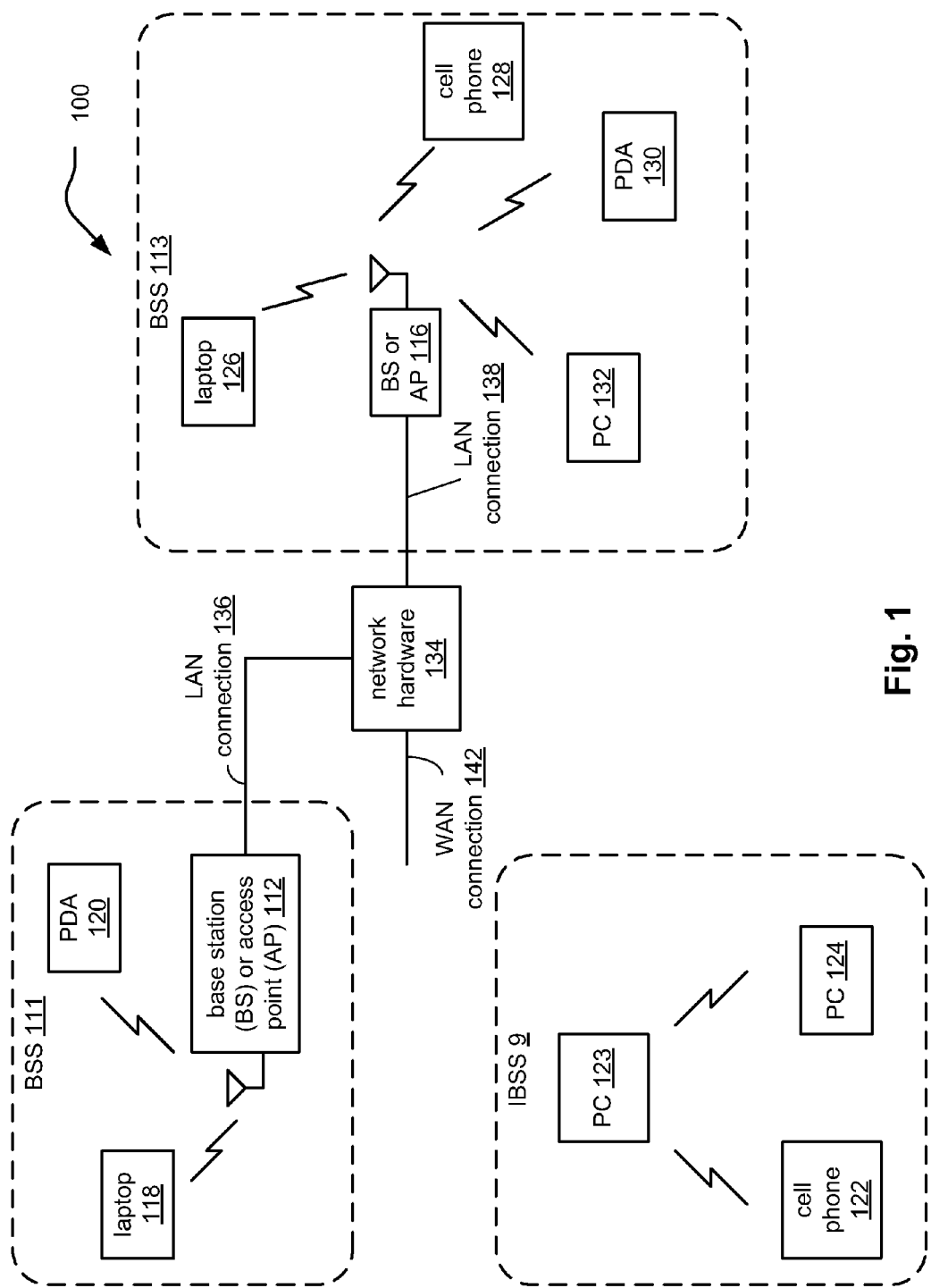
FIG. 1 is a diagram illustrating an embodiment of a wireless communication system.

A means is presented herein by which a communication device having capability to communicate via multiple protocols, standards, and/or predetermined means can be effectuated without interfering with one another. In some embodiments, this provides for collaborative coexistence of co-located mobile WiMAX (Worldwide Interoperability for Microwave Access) radio, a WLAN (Wireless Local Area Network) radio that is compatible with at least one IEEE (Institute of Electrical and Electronics Engineer) 802.11 protocol, and/or a Bluetooth radios.

Generally speaking, this novel approach can be applied to any of a wide variety of communication devices that include multiple radio modules to effectuate communication via a wide variety of communication devices within one or more different communication systems.

For example, the mobile WiMAX protocol operates at 2.5 GHz, and Bluetooth or wireless LAN operate at 2.4 GHz. As such, it is problematic to have simultaneous operation of a radio that operates in accordance with the mobile WiMAX protocol that operates at 2.5 GHz and a radio that operates in accordance with the Bluetooth or Wireless LAN protocol that operates at 2.4 GHz. In a communication device having co-located radios (e.g., one being a WiMAX radio and one being a Bluetooth or Wireless LAN radio), the simultaneous operation of those radios can suffer significant degradation including significant interference between them. This problem is even more exacerbated in a communication device having co-located radios implemented in a small form-factor platform with closely located antennae (e.g., in a multiple antennae embodiment). The over the air coupling between the multiple antennae is strong due to the small path loss between the antennae compared to if the multiple antennae were spaced relatively further from one another.

Therefore, a novel means is presented herein in which time-domain multiplexing techniques are employed. For example, based on using power savings and/or a sleep mode of operation of a radio module implemented to support mobile WiMAX within a communication device, another of the radio modules can preemptively enter into its corresponding power savings mode when the WiMAX radio module is active, and re-activate when the WiMAX radio module enters back into its corresponding power savings mode.

It is noted that the appropriate operation of each of these separate radio modules can be performed in accordance with a frame structure of a protocol employed by one of the radio modules. Alternatively, by observing the over the air signaling of one of the radio modules, other of the radio modules can react to that signaling and ensure that it operates in such a way that no collisions occur between the various communication links.

Using the means of ensuring collaborative coexistence of co-located radio modules within a communication device as provided herein, simultaneous operation of communications in accordance with these multiple protocols, standards, recommended practices, etc. can be performed within a single communication device. It is noted that any type of communication device that includes such multi-protocol communication capability can benefit from the various aspects presented herein. Some examples of communication devices include a mobile wireless communication device, a PC (personal computer), a laptop computer, and/or, generally speaking, any communication device that includes such multi-protocol communication capability and closely located carrier frequencies.

Generally speaking, when a communication device includes multiple, co-located radio modules, transmissions from one of the radio modules can saturate the receivers of other of the radio modules within that communication device. Collaborative coexistence is achieved whereby medium access control (MAC)-layer techniques ensure that transmit and receive operations within the radio modules is performed in a time-orthogonal manner. In other words, no more than one of the radio modules is active at any given time. Scheduling is performed on a frame-by-frame basis such that periods of inactivity of one of the radio modules allows activity by another of the radio modules.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, et cetera, provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
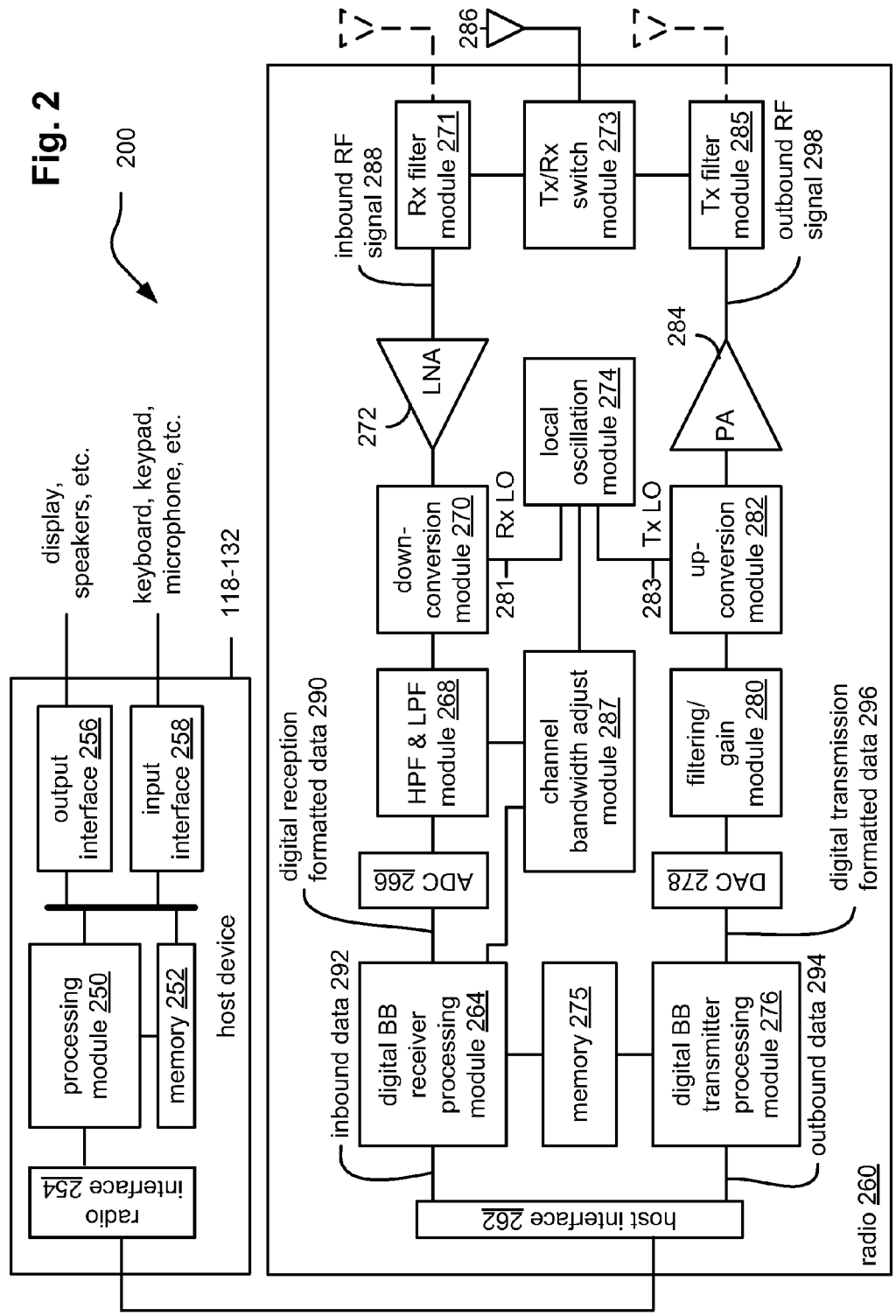
FIG. 2 is a diagram illustrating an embodiment of a wireless communication device.

FIG. 2 is a diagram illustrating an embodiment of a wireless communication device 200 that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, et cetera, such that the received data may be displayed. The radio interface 254 also provides data from the processing module 250 to the radio 260. The processing module 250 may receive the outbound data from an input device such as a keyboard, keypad, microphone, et cetera, via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device 200 is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, WiMAX (Worldwide Interoperability for Microwave Access), any other type of radio frequency based network protocol and/or variations thereof et cetera) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device 200.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a WLAN (Wireless Local Area Network) (e.g., one of the IEEE (Institute of Electrical and Electronics Engineer) 802.11 protocols such as 802.11a, 802.11b, and/or 802.11g), a Bluetooth protocol, or any other predetermined means by which wireless communication may be effectuated.

Figure 3:
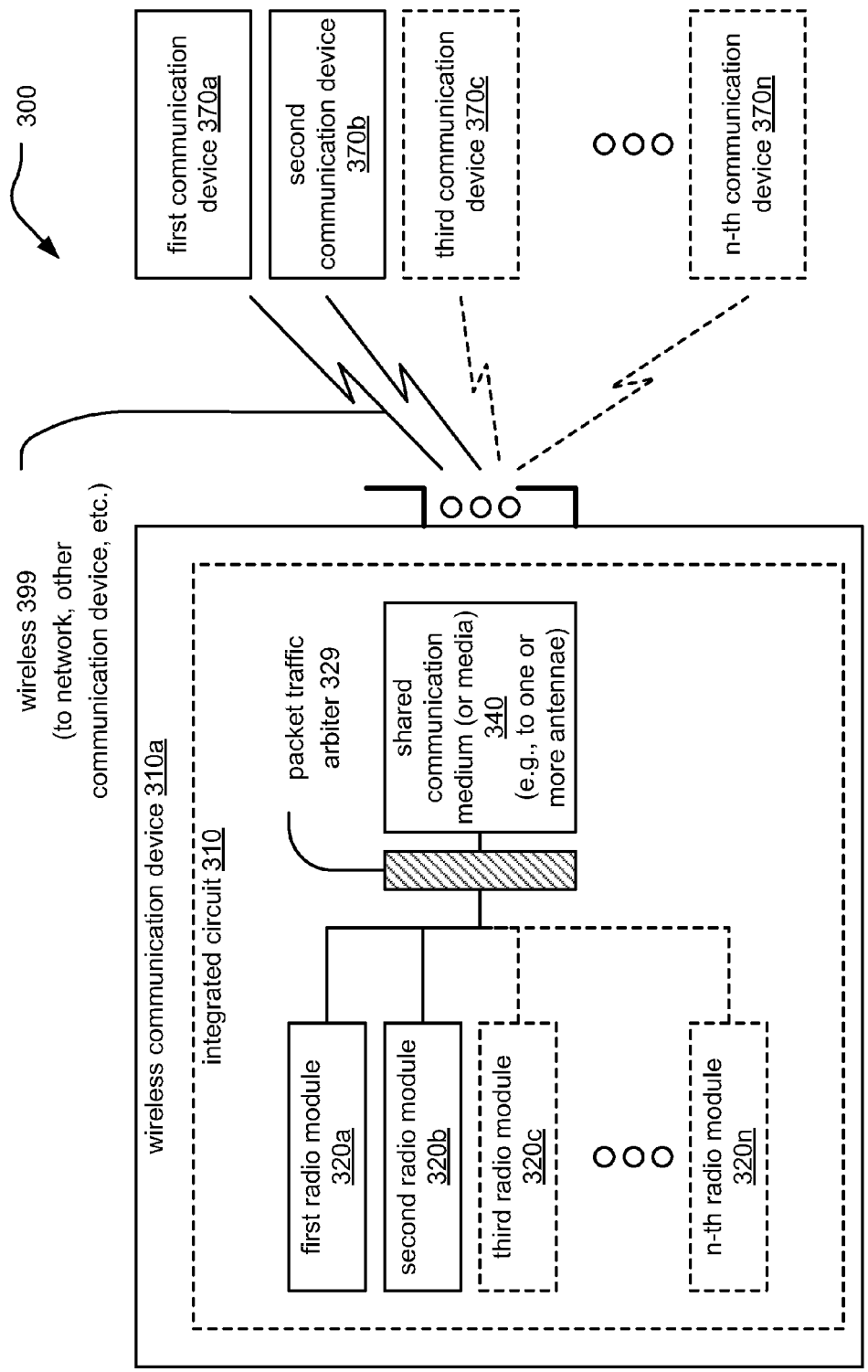
FIG. 3 is a diagram illustrating an embodiment of a wireless communication system including multiple radio modules.

FIG. 3 is a diagram illustrating an embodiment of a wireless communication system 300 including multiple radio modules. The wireless communication system 300 includes a wireless communication device 310a. In some embodiments (e.g., as shown in this diagram), the wireless communication device 310a includes an integrated circuit 310 that includes multiple radio modules (e.g., shown as first radio module 320a, second radio module 320b, third radio module 320c, and so on until n-th radio module 320n). Alternatively, in other embodiments, each of the multiple radio modules 320a-320n may be implemented on a separate integrated circuit.

The wireless communication device 310a can communicate via a wireless communication channel 399 to a communication network and/or one or more other communication devices.

For example, the first radio module 320a can be provisioned to effectuate communication with a first communication device 370a. The second radio module 320b can be provisioned to effectuate communication with a second communication device 370b, the third radio module 320c can be provisioned to effectuate communication with a third communication device 370c, and so on until n-th radio module 320c can be provisioned to effectuate communication with an n-th communication device 370n. Generally speaking, the wireless communication device 310a includes a corresponding radio module to effectuate communication with each of a variety of communication systems in accordance with a variety of communication standards, protocols, etc.

The wireless communication device 310a also includes a shared communication medium or media 340 that is/are employed by the multiple radio modules 320a-320n to effectuate wireless communication via the one or more communication devices. It is also noted that the wireless communication device 310a may also include wireline communication capability (e.g., via modem connectivity, Ethernet connectivity, fiber-optic connectivity, or other wired functionality) to allow wired/hard-connected communication capability as well without departing from the scope and spirit of the invention. For example, the wireless communication device 310a can include one or more hard-wired connections/jacks allowing it also to interface with one or more wired networks.

The wireless communication device 310a can also include a packet traffic arbiter 329 implemented to arbitrate between the multiple radio modules 320a-320n to authorize/deny access to the shared communication medium or media 340.

One of more of the multiple radio modules 320a-320n operates in accordance with a relatively rigid and strict frame structure which governs when that radio module is active and when it is inactive. One of more of the multiple radio modules 320a-320n also includes power savings functionality, in which, the radio module enters into and exits from the power savings mode based on the frame structure of the protocol (e.g., or standard, recommended practice, and/or predetermined means of operating) that governs that particular radio module.

Based on that radio module's entering into and exiting from the power savings mode, another of the radio modules conversely enters into and exits from its power savings mode to ensure that only one of the radio modules is active at a given time.

Because of space constraints, cost and design constraints, efforts to reduce form factor, etc. within the wireless communication device 310a, there may not be sufficient radio frequency (RF) isolation between the various multiple radio modules 320a-320n and the operation of only one of the multiple radio modules 320a-320n in an active mode of operation while other of the multiple radio modules 320a-320n are in a power savings (e.g., or power reduced, sleep, inactive, etc.) mode of operation. Certain of the multiple radio modules 320a-320n operate in accordance with a relatively rigid and strict frame structure, and those radio modules 320a-320n that operate in accordance with a more flexible protocol (e.g., asynchronous, etc.) are implemented to operate reactively/in response to the relatively rigid and strict frame structure of the other of the radio modules 320a-320n.

Figure 4:
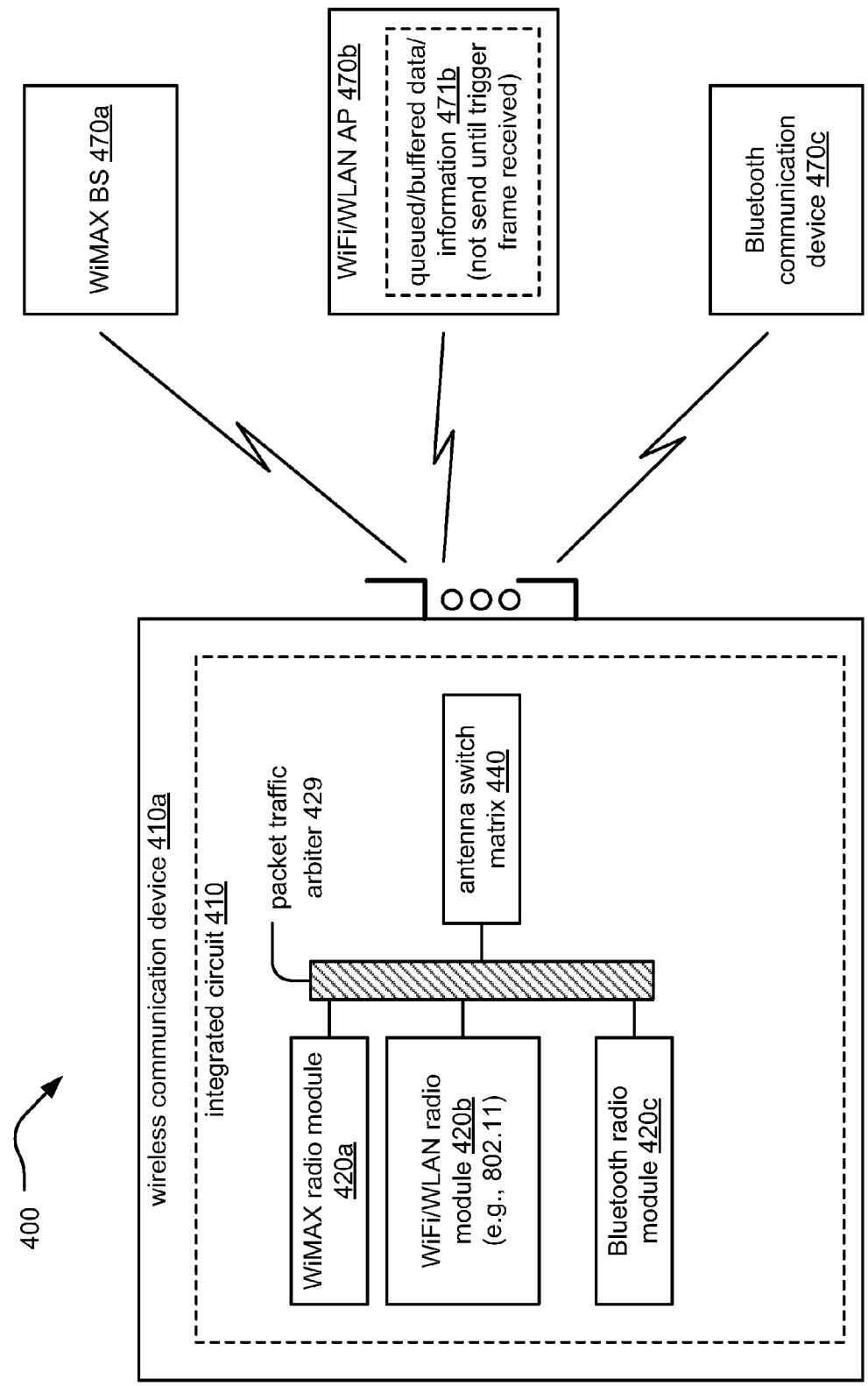
FIG. 4 is a diagram illustrating another embodiment of a wireless communication system including multiple radio modules.

FIG. 4 is a diagram illustrating another embodiment of a wireless communication system 400 including multiple radio modules. The wireless communication system 400 includes a wireless communication device 410a. In some embodiments (e.g., as shown in this diagram), the wireless communication device 410a includes an integrated circuit 410 that includes multiple radio modules (e.g., shown as a WiMAX (Worldwide Interoperability for Microwave Access) radio module 420a that is compatible with a WiMAX protocol, a WiFi/WLAN (Wireless Local Area Network) radio module 420b that is compatible with at least one IEEE (Institute of Electrical and Electronics Engineer) 802.11 protocol, and a Bluetooth radio module 420c that is compatible with a Bluetooth protocol. It is noted that each of the multiple radio modules 420a-420c may alternatively be implemented on a separate integrated circuit.

The wireless communication device 410a can communicate via a wireless communication channel 399 to a communication network and/or one or more other communication devices.

The WiMAX radio module 420a can be provisioned to effectuate communication with a WiMAX base station (BS) 470a. The WiFi/WLAN radio module 420b can be provisioned to effectuate communication with a WiFi/WLAN access point (AP) 470b or to another communication device that includes a corresponding WiFi/WLAN radio module. The Bluetooth radio module 420c can be provisioned to effectuate communication with a Bluetooth communication device 470c. Sometimes, Bluetooth communications are performed in a master/slave configuration in which only two devices communication with one another (e.g., as within a wireless headset configuration that includes an ear-piece in a user's ear that communicates with the wireless communication device 410a in another location typically relatively near to the user).

Generally speaking, the wireless communication device 410a includes a corresponding radio module to effectuate communication with each of a variety of communication systems in accordance with a variety of communication standards, protocols, etc.

The wireless communication device 410a also includes one or more communication medium or media that is/are employed by the multiple radio modules 420a-420c to effectuate wireless communication via the one or more communication devices. In this embodiment, each of the WiMAX radio module 420a, WiFi/WLAN radio module 420b and Bluetooth radio module 420c employs an antenna switch matrix 440. For example, a shared one or more antennae can be employed by the WiMAX radio module 420a, WiFi/WLAN radio module 420b and Bluetooth radio module 420c. The antenna switch matrix 440 allows for any desired one antenna or any desired combination of antennae to be dynamically connected by switches to any one radio module or any combination of the multiple radio modules 420a-420c.

Generally speaking, it is noted that the multiple antennae that may be implemented within the wireless communication device 410a may be shared between the multiple radio modules 420a-420c given their non-simultaneous operation.

Moreover, it is noted that, while WiMAX generally may be viewed as adhering to a relatively rigid frame structure, the WiMAX radio module 420a can alternatively operate outside of (e.g., not in accordance with) that relatively rigid frame structure. Considering a more detailed perspective, typical WiMAX operation is generally performed via a wireless connection that abiding to the relatively rigid WiMAX frame structure set by the WiMAX BS 470a. The WiFi/WLAN radio module 420b and/or the Bluetooth radio module 420c of the wireless communication device 410a then operate around WiMAX occupancy of the communication medium and generally operate in the intervals when the WiMAX radio module 420a is idle.

It is noted that the relatively rigid frame structure is only applicable for the particular WiMAX BS 470a to which the wireless communication device 410a is connected to, but the co-located WiMAX radio module 420a within the wireless communication device 410a needs also to scan for frames being transmitted from neighboring WiMAX Base Stations in the WiMAX cellular network in order to determine when a handoff is appropriate. This scanning takes place in the WiMAX sleep intervals (e.g., from the viewpoint of the WiMAX BS 470a that the co-located WiMAX radio module 420a within the wireless communication device 410a is connected to, the collocated WiMAX radio module 420a is sleeping but actually once in a while instead of sleeping, it performs other activities like radio calibration and scanning for energy from neighbor cells).

It is then also noted that if the WiFi/WLAN radio module 420b and/or the Bluetooth radio module 420c of the wireless communication device 410a operates in this sleep interval of the WiMAX radio module 420a, then the packet traffic arbiter 429 may also be employed to arbitrate for this situation as well.

As mentioned with other embodiments, it is also noted that the wireless communication device 410a may also include wireline communication capability (e.g., via modem connectivity, Ethernet connectivity, fiber-optic connectivity, or other wired functionality) to allow wired/hard-connected communication capability as well without departing from the scope and spirit of the invention. For example, the wireless communication device 410a can include one or more hard-wired connections/jacks allowing it also to interface with one or more wired networks.

The wireless communication device 410a can also include a packet traffic arbiter 429 implemented to arbitrate between the multiple radio modules 420a-420c to authorize/deny access to the shared communication medium 440a and the Bluetooth communication medium 440b.

One of more of the multiple radio modules 420a-420c operates in accordance with a relatively rigid and strict frame structure which governs when that radio module is active and when it is inactive. For example, WiMAX and Bluetooth protocols generally operate in accordance with more rigid, strict frame structures than WiFi/WLAN. The asynchronous, flexible nature of WiFi/WLAN allows its ability to react to and respond to the active and inactive periods of the WiMAX and/or Bluetooth protocols.

One of more of the multiple radio modules 420a-420c also includes power savings functionality, in which, the radio module enters into and exits from the power savings mode based on the frame structure of the protocol (e.g., or standard, recommended practice, and/or predetermined means of operating) that governs that particular radio module. For example, the WiMAX radio module 420a generally operates in accordance with a relatively rigid framing structure, and the WiFi/WLAN radio module 420b can operate reactively to ensure it is active and operating when the WiMAX radio module 420a is inactive.

Based on a first radio module's entering into and exiting from the power savings mode, a second radio module conversely enters into and exits from its power savings mode to ensure that only one of the radio modules is active at a given time.

Again, because of space constraints, cost and design constraints, efforts to reduce form factor, etc. within the wireless communication device 410a, there may not be sufficient radio frequency (RF) isolation between the various multiple radio modules 420a-420c and the operation of only one of the multiple radio modules 420a-420c in an active mode of operation while other of the multiple radio modules 420a-420c are in a power savings (e.g., or power reduced, sleep, inactive, etc.) mode of operation. Certain of the multiple radio modules 420a-420c (e.g., the WiFi/WLAN radio module 420b and the Bluetooth radio module 420c) operate in accordance with a relatively rigid and strict frame structure, and the WiFi/WLAN radio module 420b operates in accordance with a more flexible protocol (e.g., asynchronous, etc.) is implemented to operate reactively/in response to the relatively rigid and strict frame structure of the other of the WiMAX radio module 420a and the Bluetooth radio module 420c.

It is the WiFi/WLAN radio module 420b that performs the preemption operation to ensure that it does not operate concurrently as the WiMAX radio module 420a and the Bluetooth radio module 420c. From some perspectives, the WiMAX radio module 420a and the Bluetooth radio module 420c do not operate with care regarding to whether or not the WiFi/WLAN radio module 420b is active or not, since they operate more in accordance with their respective rigid framing structures. Certainly, each of the WiMAX radio module 420a and the Bluetooth radio module 420c need nevertheless to operate cooperatively to ensure that each one does not interfere with the other (e.g., based on their respective rigid framing structures, only one of them is active at a time).

Because of this preemptive and reactive operational nature of the WiFi/WLAN radio module 420b, there may be instances where the WiFi/WLAN radio module 420b is incapable to transmit or receive information to or from the WiFi/WLAN AP 470b or to another communication device that includes a corresponding WiFi/WLAN radio module. In such situations, when the WiFi/WLAN AP 470b has data or information intended for the wireless communication device 410a, then the WiFi/WLAN AP 470b buffers up or queues up that data or information. Then, when communication between the wireless communication device 410a and the WiFi/WLAN AP 470b is authorized again (e.g., the WiFi/WLAN radio module 420b of the wireless communication device 410a can operate), then a trigger frame is then sent from the wireless communication device 410a to the WiFi/WLAN AP 470b, and based upon receipt of that trigger frame, then the WiFi/WLAN AP 470b sends the queued/buffered data/information 471b to the wireless communication device 410a.

It is noted that the wireless communication device 410a can send a trigger frame (e.g., via the WiFi/WLAN radio module 420b) either to poll for all data frames buffered in the WiFi/WLAN AP 470b or to poll individually (e.g., using one or more PS-POLL frames) for a single frame (or a subset of the entirety of the frames) to be sent from the WiFi/WLAN AP 470b to the wireless communication device 410a.

For example, when all of the data frames buffered in the WiFi/WLAN AP 470b are requested compared to requesting a single frame (or a subset of the entirety of the frames), there is a higher risk that the polled train of packets being transmitted by the WiFi/WLAN AP 470b will collide with a WiMAX transaction. It is noted that the trigger frame that polls for all data frames buffered in the WiFi/WLAN AP 470b is more efficient in communication medium authorization that the trigger frame that polls for one (or a subset) of all of the data frames.

Depending on the WiMAX sleep interval, it is noted that the wireless communication device 410a could be implemented to pick between one or these two operational modes (e.g., either using a trigger frame to poll for all data frames buffered in the WiFi/WLAN AP 470b or to poll individually). As an example, if the WiMAX sleep interval is sufficiently longer or above a particular threshold (e.g., 15 ms in one embodiment), then the trigger frame that poll for all data frames buffered in the WiFi/WLAN AP 470b would be used. Alternatively, if the WiMAX sleep interval is sufficiently shorter or below a particular threshold (e.g., 5 ms in one embodiment), then the trigger frame that polls for only one (or a subset) of the data frames buffered in the WiFi/WLAN AP 470b would be used (e.g., using a PS-POLL frame).

Figure 5:
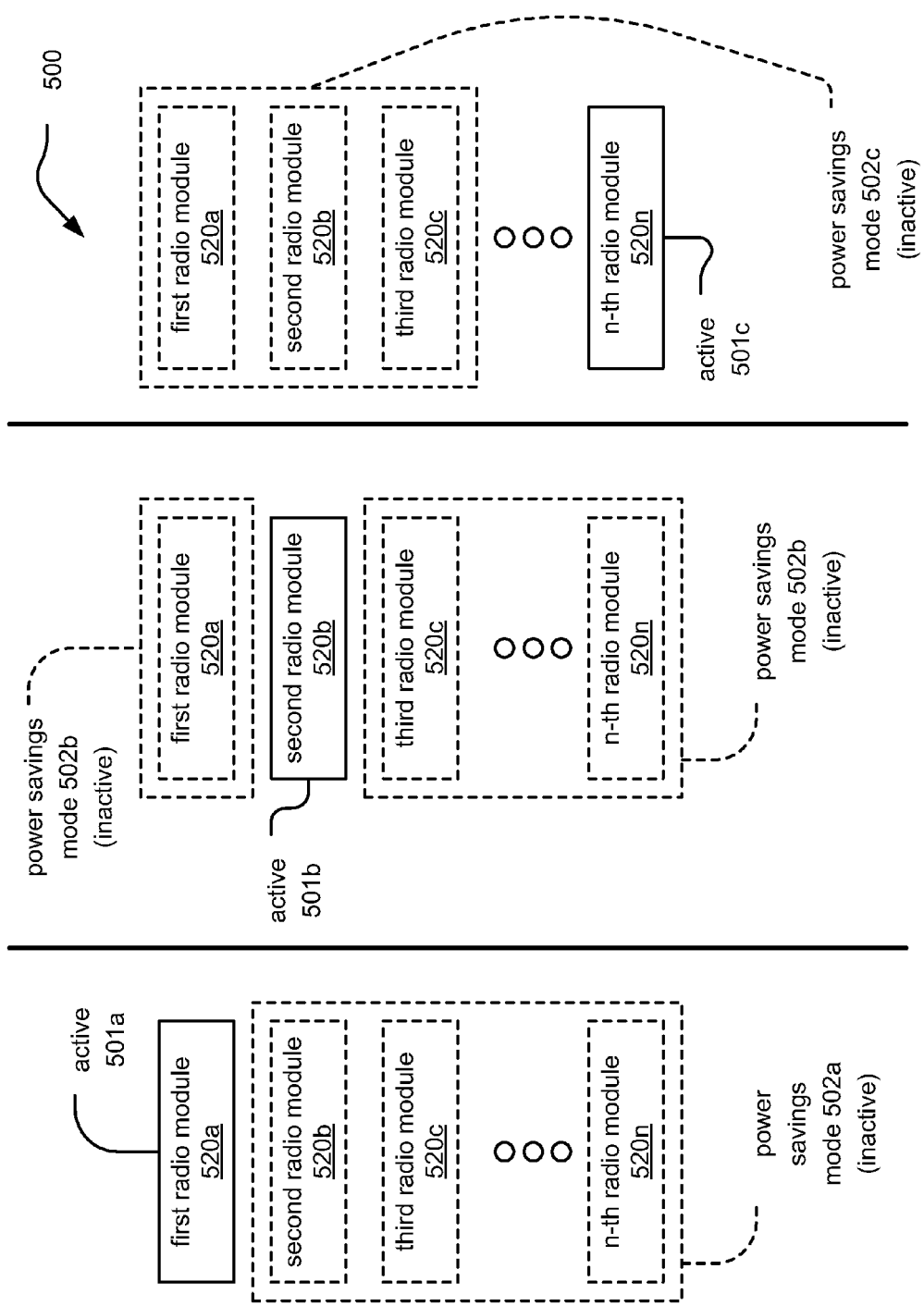
FIG. 5 is a diagram illustrating an embodiment of collective power saving mode operation among multiple radio modules such as is implemented within a wireless communication device.

FIG. 5 is a diagram illustrating an embodiment of collective power saving mode operation 500 among multiple radio modules such as is implemented within a wireless communication device.

In each of these instantiations, multiple radio modules (e.g., shown as a first radio module 520a, second radio module 520b, third radio module 520c, and so on until an n-th radio module 520n are implemented within a communication device. Only one of the radio modules 520a-520n is active at any given time, and the other of the radio modules 520a-520n are in a power savings mode (e.g., in sleep mode, turned off completely, inactive, and/or operating using a reduced operational set in which only certain of the modules, blocks, etc. therein are operational).

During a first time period, only the first radio module 520a is active (as shown by reference numeral 501a), and the other radio modules (e.g., second radio module 520b, third radio module 520c, and so on until an n-th radio module 520n) operate in accordance with a power savings mode 502a in which these radio modules are inactive when compared to the operation of the first radio module 520a.

During a second time period, only the second radio module 520b is active (as shown by reference numeral 501b), and the other radio modules (e.g., first radio module 520a, third radio module 520c, and so on until an n-th radio module 520n) operate in accordance with a power savings mode 502b in which these radio modules are inactive when compared to the operation of the second radio module 520b.

During a third time period, only the n-th radio module 520n is active (as shown by reference numeral 501c), and the other radio modules (e.g., first radio module 520a, second radio module 520b, and third radio module 520c) operate in accordance with a power savings mode 502c in which these radio modules are inactive when compared to the operation of the n-th radio module 520n.

Figure 6:
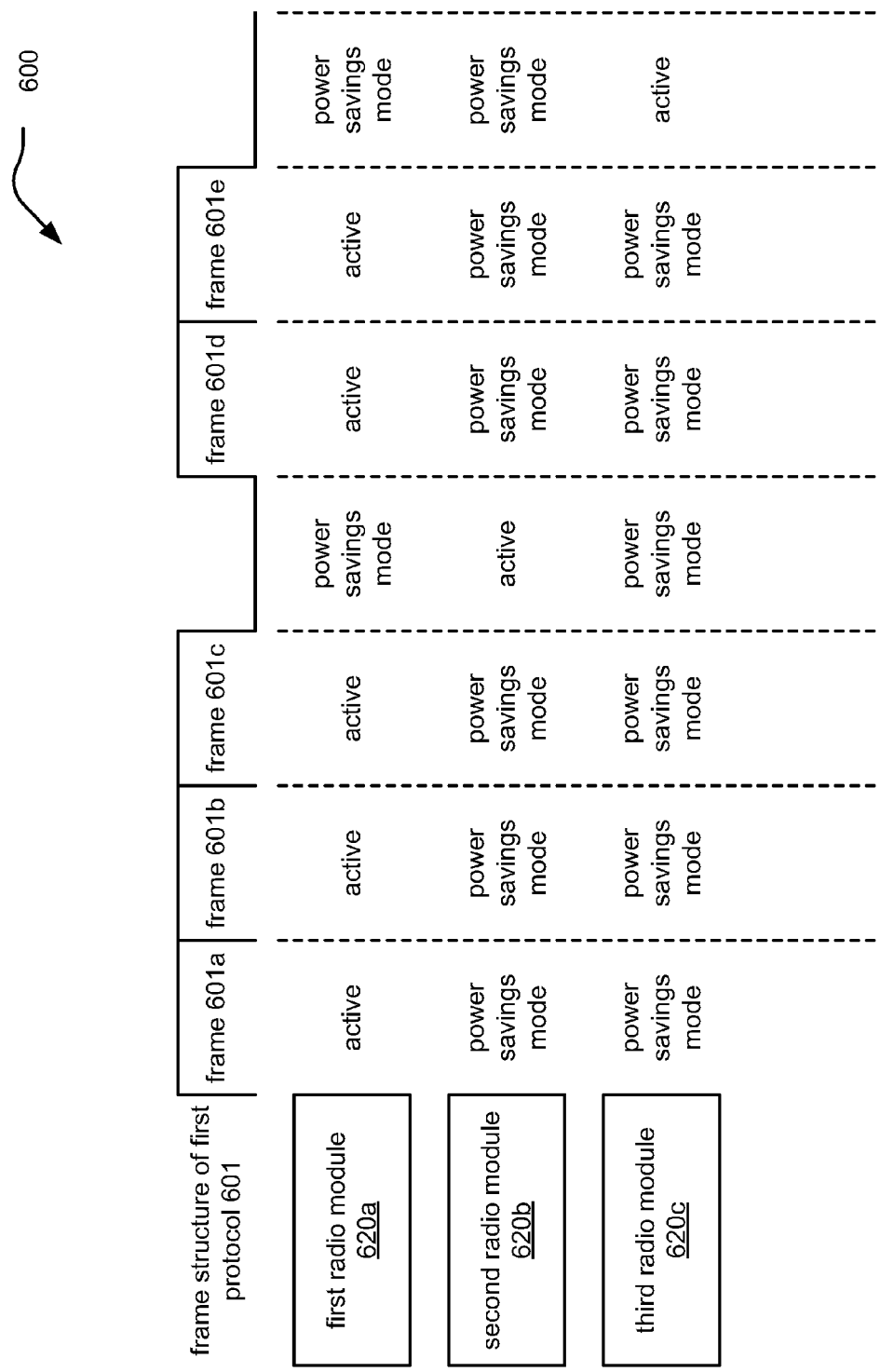
FIG. 6 and FIG. 7 illustrate embodiments of collective power saving mode operation among multiple radio modules as a function a frame structure of one of the radio modules.
Figure 7:
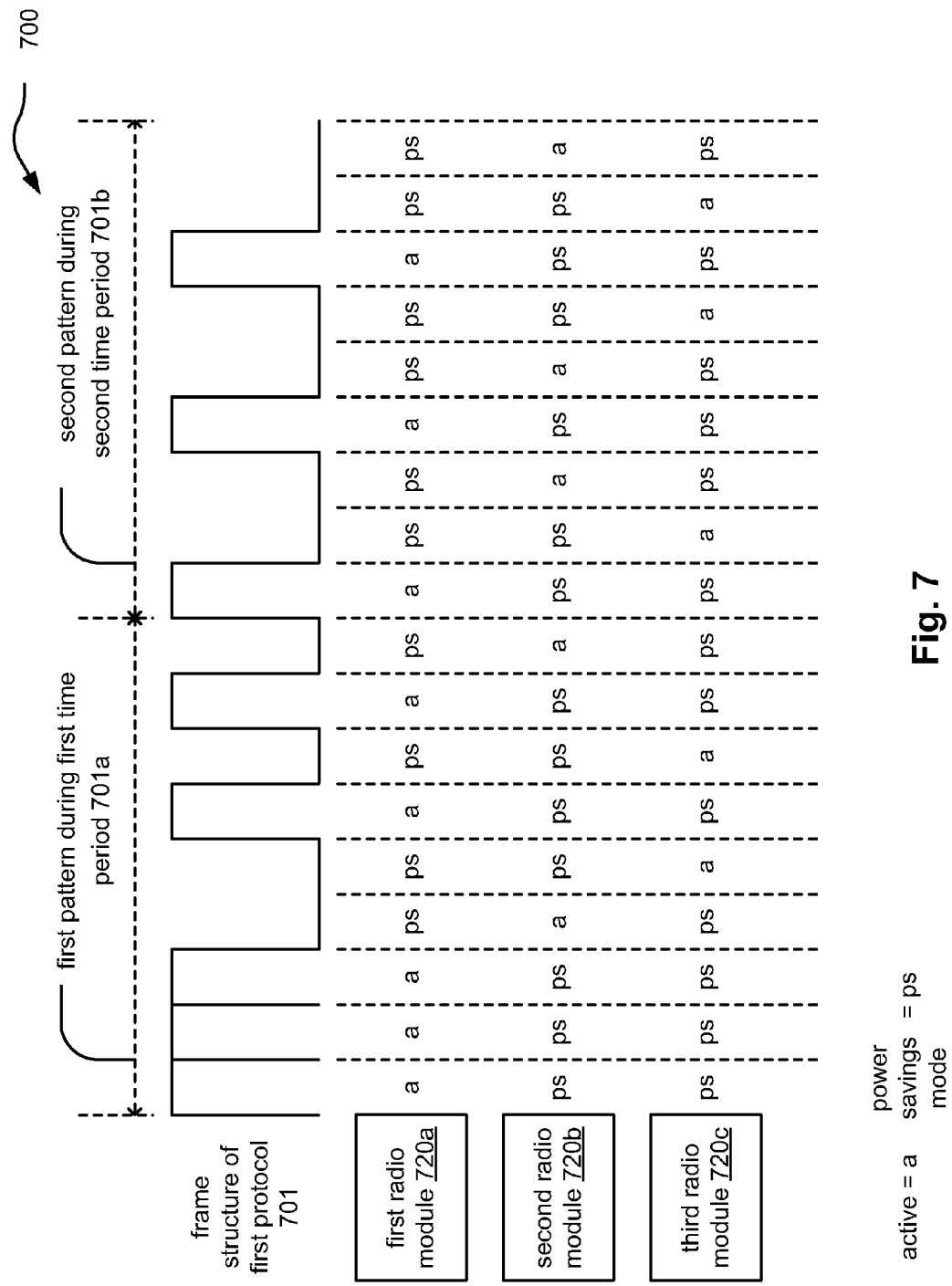

FIG. 6 and FIG. 7 illustrate embodiments of collective power saving mode operation among multiple radio modules as a function a frame structure of one of the radio modules.

Referring to embodiment 600 of FIG. 6, the frame structure of a first protocol 601 includes a plurality of frames (e.g., frames 601a, 601b, 601c, 601d, and 601e) and periods of time between frames in which there is no activity at all in accordance with that first protocol (e.g., between frames 601c and 601d and after frame 601e).

This embodiment employs three separate radio modules (e.g., first radio module 620a, second radio module 620b, and third radio module 620c), though it is noted that as few as two radio modules or more than three radio modules can alternatively be employed without departing from the scope and spirit of the invention.

The first radio module 620a operates by entering and exiting from a power savings mode based on the frame structure of the first protocol 601. The first radio module 620a is active during the duration of each of the frames 601a, 601b, 601c, 601d, and 601e and is inactive during the time periods between frames 601c and 601d and after frame 601e.

The second radio module 620b is active only during one of the two available time periods in which the first radio module 620a is inactive. For example, the second radio module 620b is active during the time period between frames 601c and 601d and is inactive otherwise.

Somewhat similarly, the third radio module 620c is active only during one of the two available time periods in which the first radio module 620a is inactive. For example, the third radio module 620b is active during the time period after frame 601e and is inactive otherwise.

As can be seen, only one of the radio modules is active at any given time period, in that, the first radio module 620a operates actively when the frame structure of the first protocol 601 authorizes/governs communication and is inactive during lulls of the frame structure of the first protocol 601.

The second radio module 620b and the third radio module 620c operate actively during those time periods, in this instance as governed by the frame structure of the first protocol 601, in which the first radio module 620a is inactive.

Referring to embodiment 700 of FIG. 7, this embodiment 700 includes multiple patterns during different time periods. For example, a frame structure of a first protocol 701 operates in accordance with a first pattern during a first time period, as indicated by reference numeral 701a, and operates in accordance with a second pattern during a second time period, as indicated by reference numeral 701b. It is noted that even more patterns can be employed during other time periods, or even a same time pattern can be repeated during multiple time periods.

During the first pattern employed during the first time period 701a of the frame structure of the first protocol 701, there are five frames during which communication is active, and four frame-time-periods of inactivity. The first radio module 720a is active during each of those five frames, and the first radio module 720a is inactive during those four frame-time-periods of inactivity. During each frame-time-period of those four frame-time-periods of inactivity in which the first radio module 720a is inactive, only one of the second radio module 720a and the third radio module 720c is active at a time.

During the second pattern employed during the second time period 701b of the frame structure of the first protocol 701, there are three frames during which communication is active, and six frame-time-periods of inactivity. The first radio module 720a is active during each of those three frames, and the first radio module 720a is inactive during those six frame-time-periods of inactivity. During each frame-time-period of those six frame-time-periods of inactivity in which the first radio module 720a is inactive, only one of the second radio module 720a and the third radio module 720c is active at a time.

Some arbitration operation can be employed to ensure that only one of the second radio module 720a and the third radio module 720c is active at a time during which the first radio module 720a is inactive.

Figure 8:
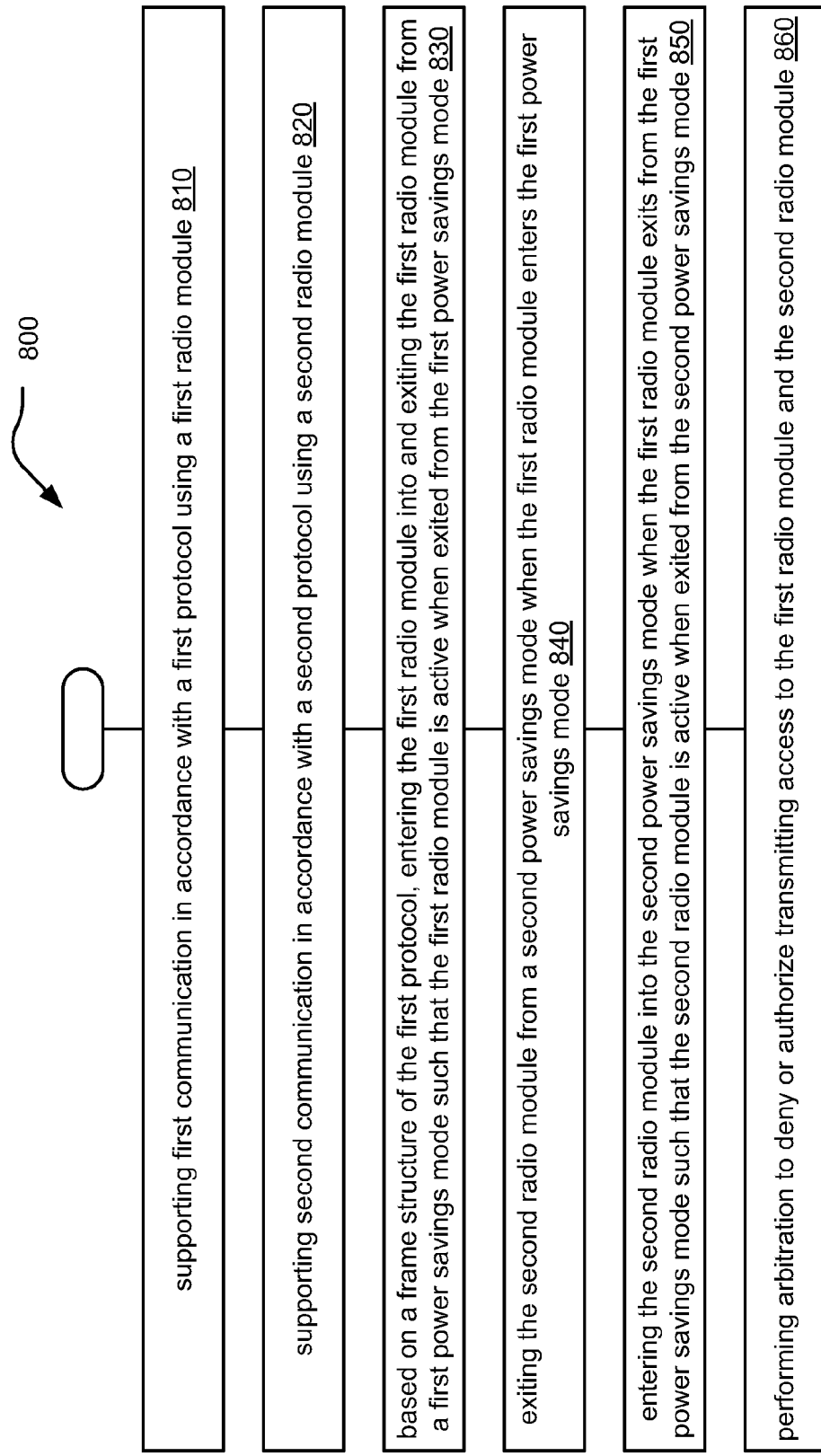
FIG. 8 illustrates an embodiment of a method for operating co-located radio modules within a communication device.

FIG. 8 illustrates an embodiment of a method 800 for operating co-located radio modules within a communication device. The method 800 begins by supporting first communication in accordance with a first protocol using a first radio module, as shown in a block 810. The method 800 continues by supporting second communication in accordance with a second protocol using a second radio module, as shown in a block 820.

Based on a frame structure of the first protocol, the method 800 continues by entering the first radio module into and exiting the first radio module from a first power savings mode such that the first radio module is active when exited from the first power savings mode, as shown in a block 830. The method 800 continues by exiting the second radio module from a second power savings mode when the first radio module enters the first power savings mode, as shown in a block 840.

The method 800 continues by entering the second radio module into the second power savings mode when the first radio module exits from the first power savings mode such that the second radio module is active when exited from the second power savings mode, as shown in a block 850. The method 800 continues by performing arbitration to deny or authorize transmitting access to the first radio module and the second radio module, as shown in a block 860.

In some embodiments, the method 800 may also perform monitoring of the frame structure of the first protocol. Then, based on a period of inactivity as determined by monitoring frame structure of the first protocol, in an alternative embodiment, the method 800 can operate by entering the first radio module into the first power savings mode.

Additional communications (e.g., a third communication) can be supported in accordance with a third protocol using a third radio module. In addition, additional communication can be supported in accordance with a fourth protocol using a fourth radio module.

Some examples of the various protocols that can be supported include a WiMAX protocol, a WLAN protocol that is compatible with at least one IEEE (Institute of Electrical and Electronics Engineer) 802.11 protocol, and a Bluetooth protocol. Clearly, additional or different protocols may alternatively be employed in any embodiment and/or equivalent embodiments of multiple operating co-located radio modules within a communication device without departing from the scope and spirit of the invention.

Figure 9:
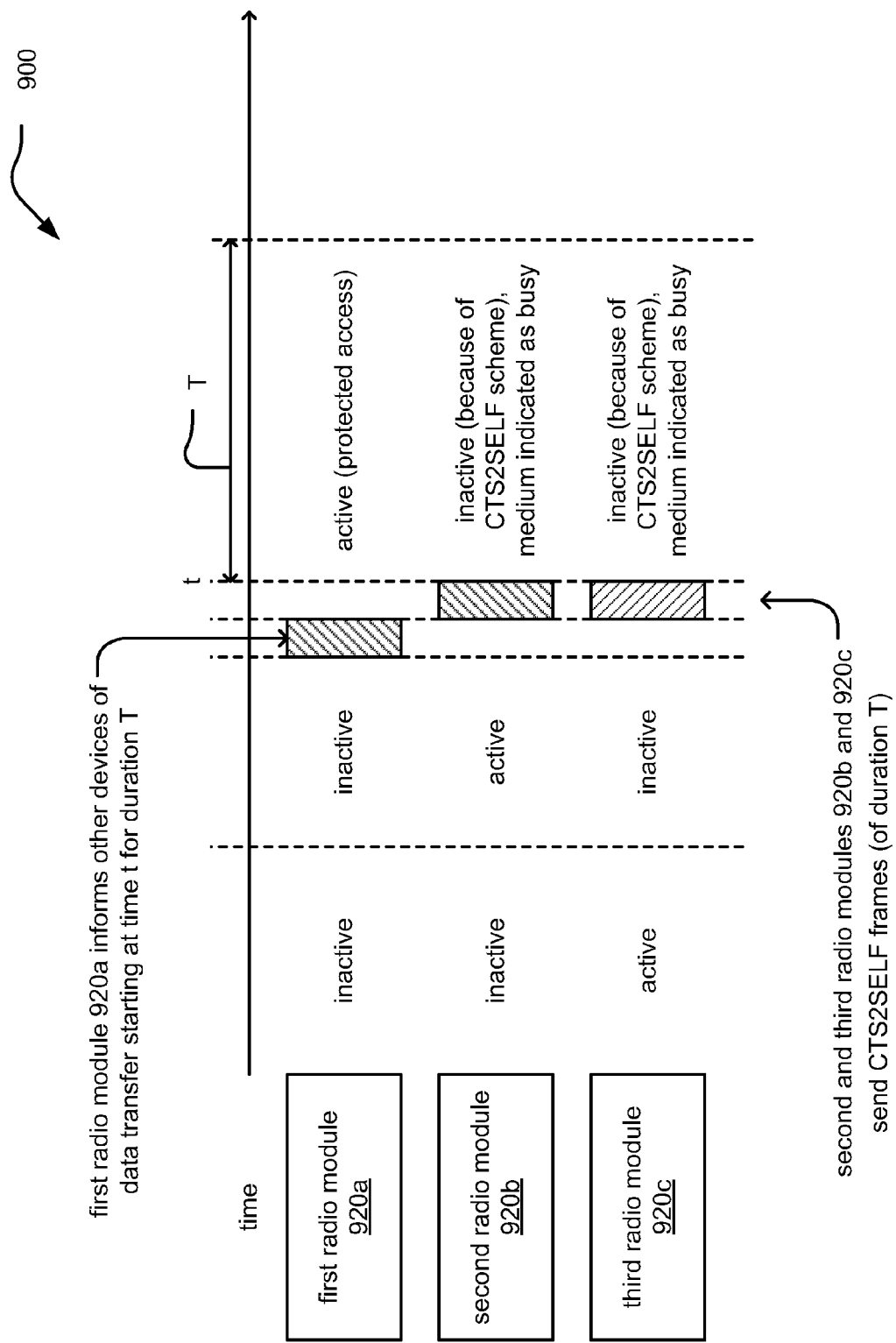
FIG. 9 illustrates an embodiment of CTS2SELF operation among multiple radio modules.

FIG. 9 illustrates an embodiment 900 of CTS2SELF operation among multiple radio modules. This embodiment 900 shows the reservation of a shared communication medium (e.g., shared by multiple, co-located radio modules within a communication device) so that it is available for only one of the radio modules in the communication device. For example, when a given radio module sends a clear to send (CTS) packets/frames addressed to itself (CTS2SELF frame), then the shared communication medium is indicated as being busy to that particular radio module.

Considering an embodiment in which one of the radio modules is a WiFi/WLAN radio module and another of the radio modules is a WiMAX radio module, the IEEE 802.11 standard allows a WLAN communication device (e.g., a device with a WiFi/WLAN radio module) to send CTS packets addressed to itself (CTS2SELF). These packets specify the duration field that is used by all WLAN nodes to update their network allocation vector (NAV) used in virtual carrier sense (CS) mechanism. If a collocated WiFi/WLAN radio module sends CTS2SELF packet addressed to itself just before a WiMAX activity slot with duration field set to be greater or equal to the duration of the upcoming WiMAX transaction, then all WLAN traffic would be inhibited during WiMAX activity.

Clearly, this is a heavy handed approach, in that, it prevents the transmission of all WiFi/WLAN traffic including beacons from any WiFi/WLAN capable-device. It does not require WiFi/WLAN AP to do any special queuing of the WiFi/WLAN packets and is compatible with any AP implementation. This approach can also be used to delay beacon and multicast packet transmission until after collocated WiMAX device transaction.

The drawback of this scheme is that the use of NAV to protect BT activity also denies medium to all WiFi/WLAN nodes. In a congested WiFi/WLAN network just a few collocated WLAN/WiMAX devices employing this method would bring WiFi/WLAN to almost complete stop.

It is also noted that the power savings operation of co-located radio modules within a communication device (e.g., as described in other embodiments herein) could also be employed in combination with CTS2SELF operation of those same co-located radio modules. If desired, based on certain conditions, the communication device could switch back and forth between the two operational modes. For example, as mentioned above, the use of the CTS2SELF operational mode could bring a congested network to almost complete stop. Congestion could be one condition that could direct the communication device to switch between the two operational modes (e.g., operate in accordance with the power savings operational mode when network is congested and operate in accordance with the CTS2SELF operational mode when network is not congested).

Figure 10:
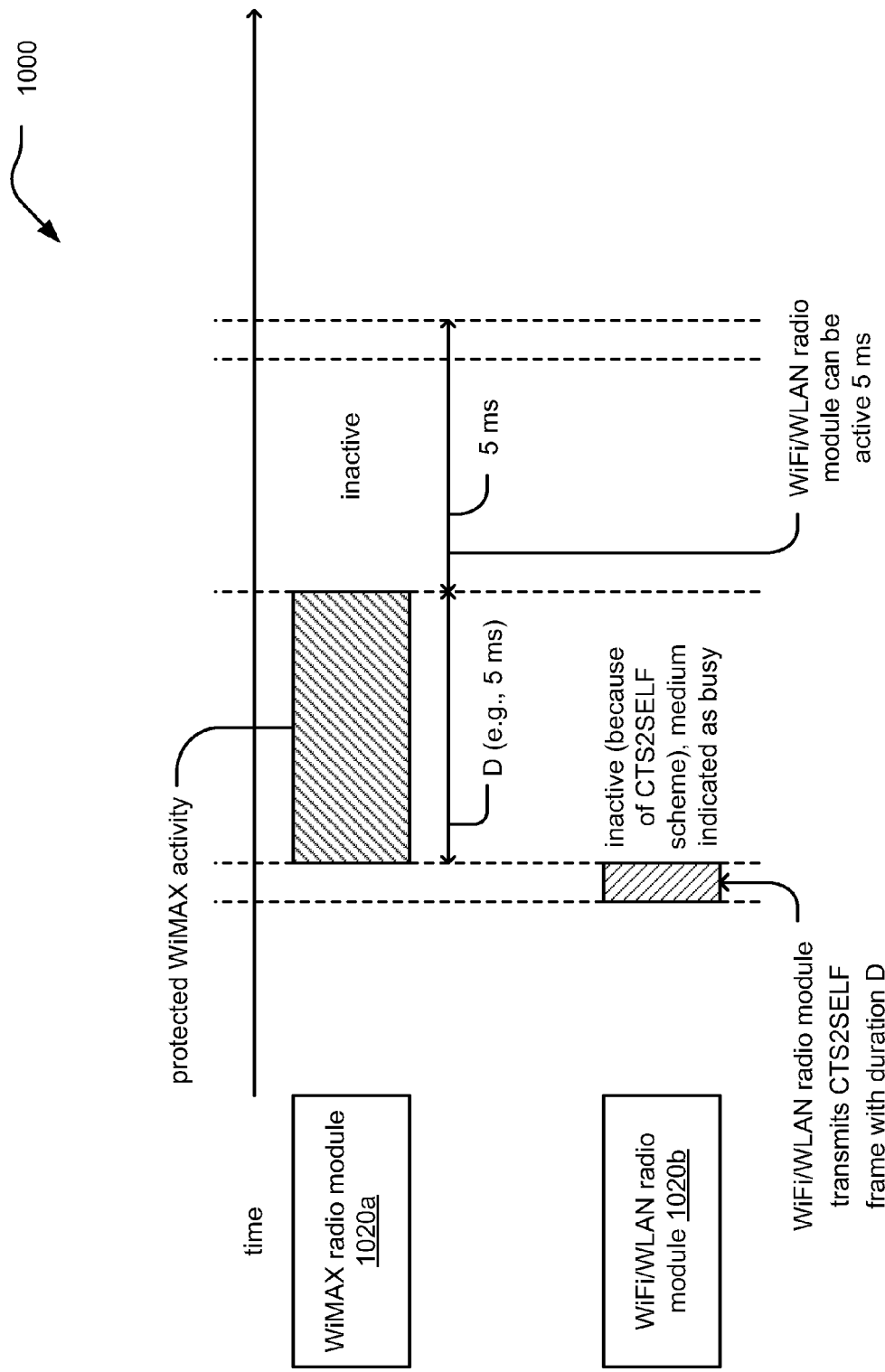
FIG. 10 illustrates an alternative embodiment of CTS2SELF operation among multiple radio modules.

FIG. 10 illustrates an alternative embodiment 1000 of CTS2SELF operation among multiple radio modules. This diagram shows how the use of a CTS2SELF operational scheme can be employed to protect communication via a WiMAX communication link.

A WiMAX radio module 1020a informs the WiFi/WLAN radio module 1020b that there is an upcoming WiMAX data transfer at time t that will have duration of D. The WiFi/WLAN radio module 1020b may be informed that the the duration of the upcoming WiMAX traffic will be 5 milliseconds in duration (e.g., D=5 ms).

The WiFi/WLAN radio module 1020b then prepares the CTS2SELF frame with the duration set to 5 ms and transmits. A successful transmission of CTS2SELF frame prevents any WiFi/WLAN activity for 5 ms, enough for the WMAX radio module 1020a to complete the transaction. The communication medium becomes free once the WiMAX activity is over and WiFi/WLAN devices can then use the medium until the next WiMAX slot (approximately 5 ms later). Then the entire cycle may be repeated as needed or desired in a particular application.

It has to be noted that as the communication medium access is not deterministic, then the transmission of CTS2SELF cannot itself be guaranteed. The protection given by CTS2SELF scheme will be statistical, in that, it depends upon the number of other WiFi/WLAN devices being present in the vicinity.

Figure 11:
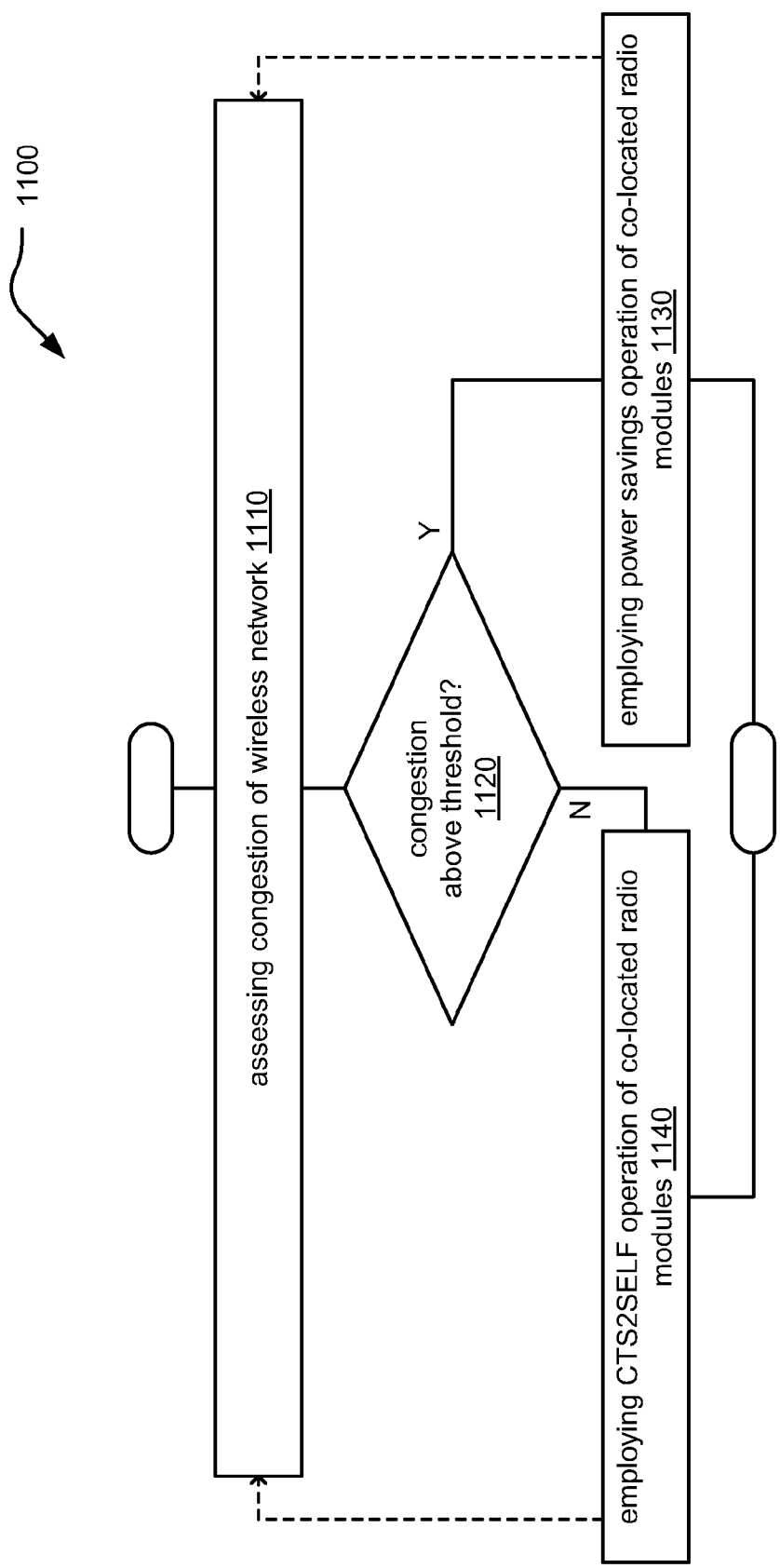
FIG. 11 illustrates an alternative embodiment of a method for operating co-located radio modules within a communication device.

FIG. 11 illustrates an alternative embodiment of a method 1100 for operating co-located radio modules within a communication device. As shown in a block 1110, the method 1100 begins by assessing congestion of a wireless network. This assesses congestion of the wireless network can be compared to a threshold (e.g., which can be predetermined or adaptively determined).

When the congestion is above this threshold as determined in a decision block 1120, then the method 1100 operates by employing a power savings operation of co-located radio modules, as shown in a block 1130.

When the congestion is below this threshold as determined in the decision block 1120, then the method 1100 operates by employing a CTS2SELF operation of co-located radio modules, as shown in a block 1140.

Thereafter, the method 1100 can continue by re-assessing the congestion of the wireless network (e.g., by repeating the operation of the block 1110). The threshold employed to determine whether or not the wireless network s congested or not can be different than the threshold used before.

This method 1100 illustrates one possible embodiment in which both a power savings operational mode and a CTS2SELF operational mode can be employed within a single communication device and/or a single communication system.

It is noted that the various modules (e.g., radio modules, arbiters, baseband processing modules, processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
a first radio module implemented to support first communications based on a first protocol having a first frame structure; and
a second radio module implemented to support second communications based on a second protocol having a second frame structure; and wherein:
based on at least one of the first frame structure and the second frame structure, at least one of the first radio module and the second radio module selectively operative to enter into a power savings mode in which at least one of the first radio module and the second radio module inoperable to receive communications from at least one additional apparatus; and
based on at least one of the first frame structure and the second frame structure, at least one of the first radio module and the second radio module selectively operative to exit from the power savings mode during at least one selected time interval associated with at least one of the first frame structure and the second frame structure in which at least one of the first radio module and the second radio module operable to receive communications from the at least one additional apparatus.

2. The apparatus of claim 1, wherein:
based on at least one of the first frame structure and the second frame structure, at least one of the first radio module and the second radio module selectively operative to enter into the power savings mode in which at least one of the first radio module and the second radio module inoperable to transmit communications to the at least one additional apparatus; and
based on at least one of the first frame structure and the second frame structure, at least one of the first radio module and the second radio module selectively operative to exit from the power savings mode during at least one selected time interval associated with at least one of the first frame structure and the second frame structure in which at least one of the first radio module and the second radio module operable to transmit communications to the at least one additional apparatus.

3. The apparatus of claim 1, wherein:
based on at least one of the first frame structure and the second frame structure, at least one of the first radio module and the second radio module selectively operative to exit from the power savings mode during at least one selected time interval associated with at least one of the first frame structure and the second frame structure in which the at least one of the first radio module and the second radio module operable to poll the at least one additional apparatus for at least one frame buffered within the at least one additional apparatus.

4. The apparatus of claim 1, wherein:
based on at least one of the first frame structure and the second frame structure, at least one of the first radio module and the second radio module selectively operative to exit from the power savings mode during at least one selected time interval based on a frame by frame basis schedule.

5. The apparatus of claim 1, further comprising:
a shared communication medium implemented to effectuate wireless communications for both the first radio module and the second radio module; and
wherein:
the first protocol being a WiMAX (Worldwide Interoperability for Microwave Access) protocol; and
the second protocol being a WLAN (Wireless Local Area Network) protocol that is compatible with at least one IEEE (Institute of Electrical and Electronics Engineer) 802.11 protocol or a Bluetooth protocol.

6. The apparatus of claim 1, wherein:
the apparatus being a wireless communication device; and
the at least one additional apparatus being a WLAN (Wireless Local Area Network) AP (Access Point).

7. An apparatus, comprising:
at least one radio module implemented to support first communications based on a first protocol having a first frame structure and second communications based on a second protocol having a second frame structure; and wherein:

based on at least one of the first frame structure and the second frame structure, the at least one radio module selectively operative to enter into a power savings mode in which the at least one radio module inoperable to receive communications from at least one additional apparatus; and based on at least one of the first frame structure and the second frame structure, the at least one radio module selectively operative to exit from the power savings mode during at least one selected time interval associated with at least one of the first frame structure and the second frame structure in which the at least one radio module operable to receive communications from the at least one additional apparatus.

8. The apparatus of claim 7, wherein:
at least one radio module including a first radio module implemented to support first communications based on the first protocol having the first frame structure and a second radio module implemented to support second communications based on the second protocol having the second frame structure.

9. The apparatus of claim 7, wherein:
based on at least one of the first frame structure and the second frame structure, the at least one radio module selectively operative to enter into the power savings mode in which the at least one radio module inoperable to transmit communications to the at least one additional apparatus; and based on at least one of the first frame structure and the second frame structure, the at least one radio module selectively operative to exit from the power savings mode during at least one selected time interval associated with at least one of the first frame structure and the second frame structure in which the at least one radio module operable to transmit communications to the at least one additional apparatus.

10. The apparatus of claim 7, wherein:
based on at least one of the first frame structure and the second frame structure, the at least one radio module selectively operative to exit from the power savings mode during at least one selected time interval associated with at least one of the first frame structure and the second frame structure in which the at least one radio module operable to poll the at least one additional apparatus for at least one frame buffered within the at least one additional apparatus.

11. The apparatus of claim 7, wherein:
based on at least one of the first frame structure and the second frame structure, the at least one radio module selectively operative to exit from the power savings mode during at least one selected time interval based on a frame by frame basis schedule.

12. The apparatus of claim 7, wherein:
the at least one radio module including a first radio module and a second radio module; and further comprising:
a shared communication medium implemented to effectuate wireless communications for both the first radio module and the second radio module.

13. The apparatus of claim 7, wherein:
the first protocol being a WiMAX (Worldwide Interoperability for Microwave Access) protocol; and the second protocol being a WLAN (Wireless Local Area Network) protocol that is compatible with at least one IEEE (Institute of Electrical and Electronics Engineer) 802.11 protocol or a Bluetooth protocol.

14. The apparatus of claim 7, wherein:
the apparatus being a wireless communication device; and
the at least one additional apparatus being a WLAN (Wireless Local Area Network) AP (Access Point).

15. A method for operating a wireless communication device, the method comprising:
operating at least one radio module for supporting first communications based on a first protocol having a first frame structure and second communications based on a second protocol having a second frame structure;

based on at least one of the first frame structure and the second frame structure, operating the at least one radio module selectively to enter into a power savings mode in which the at least one radio module inoperable to receive communications from at least one additional wireless communication device; and based on at least one of the first frame structure and the second frame structure, operating the at least one radio module selectively to exit from the power savings mode during at least one selected time interval associated with at least one of the first frame structure and the second frame structure in which the at least one radio module operable to receive communications from the at least one additional wireless communication device.

16. The method of claim 15, wherein:
at least one radio module including a first radio module implemented to support first communications based on the first protocol having the first frame structure and a second radio module implemented to support second communications based on the second protocol having the second frame structure.

17. The method of claim 15, wherein:
based on at least one of the first frame structure and the second frame structure, operating the at least one radio module selectively to exit from the power savings mode during at least one selected time interval associated with at least one of the first frame structure and the second frame structure in which the at least one radio module operable to poll the at least one additional apparatus for at least one frame buffered within the at least one additional apparatus.

18. The method of claim 15, wherein:
based on at least one of the first frame structure and the second frame structure, operating the at least one radio module selectively to exit from the power savings mode during at least one selected time interval based on a frame by frame basis schedule.

19. The method of claim 15, wherein:
the at least one radio module including a first radio module and a second radio module; and further comprising:
operating a shared communication medium to effectuate wireless communications for both the first radio module and the second radio module.

20. The method of claim 15, wherein:
the at least one additional wireless communication device being a WLAN (Wireless Local Area Network) AP (Access Point).

* * * * *